Oct. 9, 1934.  E. J. JOSS  1,976,348
METHOD AND APPARATUS FOR THE MANUFACTURE OF RUBBER THREAD
Filed April 16, 1932
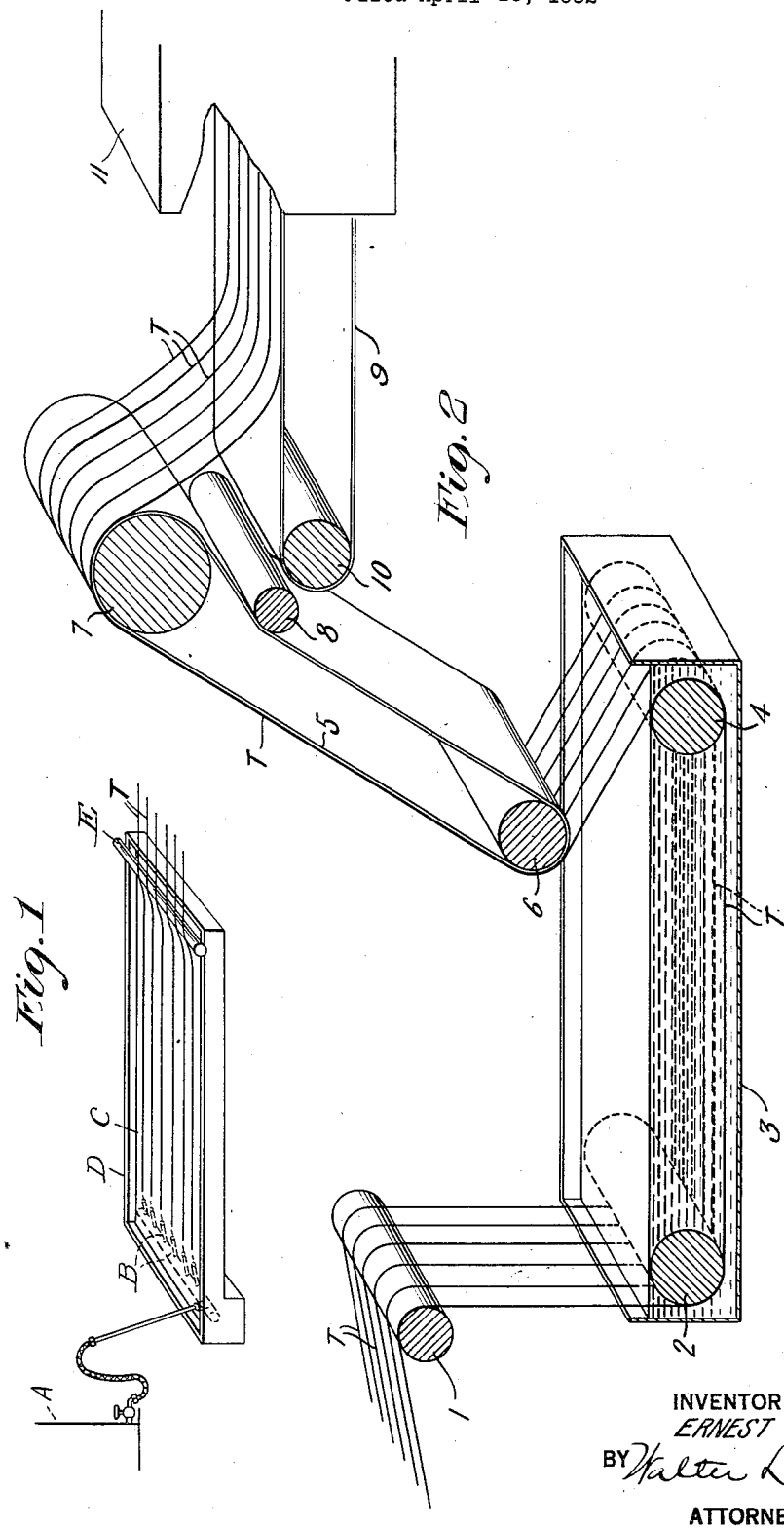
INVENTOR
ERNEST J. JOSS
BY Walter L. Piper
ATTORNEY

UNITED STATES PATENT OFFICE 1,976,348

METHOD AND APPARATUS FOR THE MANUFACTURE OF RUBBER THREAD

Ernest J. Joss, Bristol, R. I., assignor to Revere Rubber Company, Providence, R. I., a corporation of Rhode Island Application April 16, 1932, Serial No. 605,670

18 Claims. (Cl. 18—54)

This invention relates to the manufacture of rubber thread and more particularly to reducing the cross sectional dimensions of rubber thread and thereby producing a thread of a smaller size from one of a larger size.

In practice rubber thread is generally made by one of three common methods. First, thread may be made by cutting sheets of rubber into narrow strips or thread of the desired width. By a second method, a plastic rubber composition, or rubber solvent cement, may be extruded through a die and the solvent removed, leaving a thread of the desired shape and size. Thirdly, rubber thread may be produced directly from an aqueous dispersion of rubber. One method of producing thread directly from an aqueous dispersion of rubber is by extruding or streaming such aqueous dispersion of rubber through a nozzle or orifice and withdrawing and coagulating the dispersion in the form of a thread in the shape of the nozzle opening. In Hopkinson and Gibbons Patent No. 1,545,257, dated July 7, 1925, there is disclosed one such extrusion or streaming process of making rubber thread directly from aqueous dispersions of rubber, wherein the dispersion is extruded or caused to flow through a nozzle into a bath of coagulant, such as acetic acid or alcohol, and the coagulum withdrawn from the bath in the form of a continuous thread. In this process, the size and shape of the nozzle determine to a great extent the size and shape of the finished thread. The shape and size of the thread may be varied by varying the contour and size of the orifice, by varying the depth of the nozzles below the surface of the coagulant, by varying the specific gravity of the coagulant, or by altering the rate of withdrawal of material through the orifice. An excessive increase in the rate of withdrawal of the material through the orifice will tend to decrease the diameter of the thread as it is formed in the coagulant, but such variation in size may be accompanied by an undesirable change in the cross sectional shape of the thread.

One object of this invention is to provide a process and apparatus for permanently reducing the cross sectional dimensions of rubber thread, substantially without changing the cross-sectional shape of the thread. It is also an object of the invention to provide a process and apparatus for making a large variety of sizes of rubber thread from a thread of a larger size having the desired shape. A further object of this invention is to reduce the number of nozzles of each shape required for the production of various sizes of thread by the extrusion methods described above. Other objects and advantages will be apparent from the following description.

In the drawing:

Figure 1 illustrates, more or less diagrammatically, an extrusion or streaming process for making rubber thread from an aqueous dispersion of rubber; and Figure 2 shows a perspective view, partly broken away, of a present preferred form of apparatus for practicing the invention.

According to the invention, a thread of a given shape, such as a thread cut from a sheet, or one extruded from a plastic rubber composition or a rubber solvent cement, or one prepared from an aqueous dispersion of rubber by extruding or passing through a nozzle and forming a continuous length of coagulum in the form of a thread therefrom, or produced in any other desired manner, is stretched to reduce the cross sectional dimensions thereof to a size equal to or smaller than the ultimately desired size, and heated, if desired, at elevated temperatures in a suitable medium such as a hot water bath to relieve, at least in part, the stresses in the stretched thread, by annealing. The thread may then be allowed to retract to the ultimately desired size; or, if the thread has been stretched to just the ultimately desired size, all of the stresses may be removed by annealing while the thread is restrained from contracting longitudinally. In the latter case the drying and the annealing of the thread may be effected simultaneously.

Referring more particularly to the drawing, Figure 1 shows the production of rubber thread directly from an aqueous dispersion of rubber as in the Hopkinson & Gibbons Patent No. 1,545,257 above referred to. Latex, or other aqueous dispersion of rubber, passes from the tank A to a bank of nozzles B through which the latex is extruded or streamed into and through coagulant C in tank D and over roll E whence it may be delivered in the form of thread T to further operations such as the device of the present invention shown in Figure 2.

As shown in Fig. 2, threads T manufactured by any of the methods commonly known, for example as shown in Figure 1, may be passed over a guide roll 1 and around submerging roll 2 in tank 3, containing water preferably at elevated temperatures, and thence around stretcher roll 4 and onto conveyor belt 5. Belt 5 passes over pulleys 6 and 7 and around idler 8 and delivers the thread to conveyor belt 9 passing around pulley 10. In the particular embodiment of the invention represented by the drawing, conveyor belt 9 is arranged to convey the thread through a drier 11, such as a heated air tunnel. The relative speeds of the various parts of the apparatus will be discussed in a description of the operation of the process.

In the operation of the process assume, for example, that it is desired to make a size 40 square thread (1/40 of an inch square) from a size 20 square thread. In order to produce size 40 thread, belt 9 must receive the thread at four times the surface speed of the guide roll 1 over which the size 20 thread passes, since the cross sectional area of a size 40 thread is one-quarter that of a size 20 thread, and the length of the size 40 thread is correspondingly four times greater. The thread will be stretched in the course of its travel between the guide roll 1 and the stretcher roll 4, and may be so stretched either entirely between guide roll 1 and submerging roll 2, or entirely in the tank between submerging roll 2 and stretcher roll 4, or by a combination of stretching operations between rolls 1 and 2 outside the bath 3 and between the rolls 2 and 4 inside the bath. Roll 4 is run at some peripheral speed in excess of the surface speed of belt 9. Roll 2, as above described, is run at some peripheral speed between the speeds of roll 1 and roll 4 and may be so regulated as to keep the thread either unstretched between rolls 1 and 2, or stretched to the extent desired as above described. Roll 4 is run at a speed greater than that of belt 9 and stretches the thread to a smaller size than is desired for the finished thread. Conveyor belt 5 is run at the same speed as or slightly faster than belt 9.

The hot water in the tank 3 relieves part of the stresses in the rubber thread by annealing; the remaining stresses are then relieved by contraction of the rubber during the course of its travel from roll 4 to belt 9, because of the slower speed of belt 9 relative to the speed of roll 4. The relative speeds of roll 4, belt 5, and belt 9 are so adjusted that the thread is deposited on belt 9 without tension and without undue slack. For this purpose variable speed driving means for the rolls 10, 7, 6 and 4 are provided. In practice it is convenient to have rolls 10 and 7 driven from a common shaft which in turn is driven by a motor acting through a variable speed control means. Roll 6 is driven by roll 7 through belt 5. Roll 4 is driven by roll 6 through suitable connecting means including a second variable speed control means.

Whether the thread is being properly delivered to the belt 9 will be shown by the path which the thread follows in passing from belt 5 onto belt 9. If roll 4 is rotating too slowly, the thread will tend to become taut and to be lifted from belt 9, and will therefore be delivered to belt 9 under tension. If roll 4 is rotating too fast and belt 5 is traveling at a greater speed than belt 9, the thread will become increasingly slack on passing from belt 5 onto belt 9, and hence will fall on belt 9 in loops. If roll 4 is rotating too fast and the speed of belt 5 is equal to the speed of belt 9, then the thread in passing from roll 4 to belt 5 will become slack, and will accumulate and become entangled at the bottom of the reach.

Roll 2 may be run at a peripheral speed only very slightly in excess of that of roll 1 or it may be run at any speed approaching that of roll 4, depending on whether it is found best under the conditions of operation to stretch the thread before it passes into the hot water or to stretch it while it is in the hot water or to stretch it progressively by a succession of such stretching operations. It is desirable to have the temperature of the water in the tank as near as possible to its boiling point without detriment to the thread, in order to quickly and effectively anneal the rubber and thereby make it possible to run roll 4 at lower speeds than would be necessary were no bath or a bath at less elevated temperatures used.

In place of using a water bath, the thread may be subjected to annealing conditions by passing it, while stretched, through any suitable receptacle containing a fluid medium, either liquid or gaseous, at the desired temperature, or by subjecting the thread for a short time to the action of a liquid solvent or swelling agent for rubber or to the vapors thereof.

It is obvious that either belt 5 or belt 9, or both belts, may be dispensed with and other suitable take-up or receiving means for the thread employed in place thereof; for example, the thread may be passed from roll 4 over a guide roll rotating at a suitable speed, and thence delivered to and wound on a spool or drum substantially without tension. Or, conveyor belt 5 may be employed to deliver the thread to any desired apparatus, such as for winding, drying, curing, etc.

The process is not necessarily limited to a single stretching, as disclosed in the accompanying drawing, but the stretching process may be carried out successively in a number of steps either with or without an intermediate annealing process. For example, a succession of rolls rotating at progressively greater peripheral speeds may be interposed between roll 1 and roll 4 of the drawing. The thread may be passed tensionally over such series of rolls either before or during the treatment with hot water, or both. Such progressive stretching is particularly desirable in the case of flat thread or tape, in order to provide better control over the ratio of the width of the stretched thread to its thickness whereby to substantially prevent a relative flattening of the cross-section of the thread.

By the invention herein disclosed, a wide variation in the sizes of thread of a given shape may be produced from a single thread, the shape of the thread produced being substantially the same as that of the original thread, and the ratio of the cross sectional dimensions being substantially the same. In processes where an extrusion die or a nozzle or orifice is used in the process of manufacturing the thread, the present invention enables various sizes of thread of a given shape to be produced from a small number of larger nozzles of the same shape. Heretofore, at best, a single nozzle was capable of producing only a limited number of sizes of thread variable in gauge within relatively narrow limits. In the preparation of thread from aqueous dispersions of rubber by passing such dispersion through a nozzle and coagulating the rubber in the form of a thread, it has been found that more sharply defined shapes of thread can be produced by drawing from the nozzles at low speeds rather than at high speeds. This invention enables such thread forming process to be run at slow speeds thereby resulting in a more perfect control of the cross-sectional shape, as well as necessitating relatively few sizes of nozzles for each different shape. In such case, however, the rate of production of the small thread can be made as high as is found practicable, by the process of the present invention.

When the thread is formed continuously, as by streaming an aqueous rubber dispersion through a nozzle into a coagulating medium as shown in Figure 1, the thread may be delivered directly from the thread-forming apparatus to the stretching apparatus and the two machines operated simultaneously, whereby the production of finished thread of any desired size from such dispersion may be carried out continuously as a unit operation.

Various modifications of the process as above described will be apparent to persons skilled in the art. For example, it is desirable to stretch the thread in a hot water bath, or other suitable heating medium, as shown, in order to at least partially relieve stresses in the rubber, but such is not essential, although without some such annealing step, the thread will retract by a greater amount and the effectiveness of the stretching operation will be thereby greatly decreased. It is preferable that the stretching operation be applied to an unvulcanized or partially vulcanized thread and, if desired, after such operation, that the thread be completely vulcanized in any desired manner. If desired, thread containing vulcanizing ingredients adapted to cure at the temperature of the annealing medium may be used, and in such case the stretching and the annealing may be accompanied by a concurrent vulcanization of the thread. The annealing bath or other medium may itself contain one or more vulcanizing ingredients adapted to migrate into the thread and cause a vulcanization thereof simultaneously with the annealing process or subsequently thereto.

The term "rubber" in the description and claims is intended to include materials such as rubber substitutes and synthetic materials resembling rubber, as well as rubber-like natural materials such as balata, gutta-percha, and the like. The term "aqueous dispersion of rubber" as used in the description and claims comprehends natural dispersions such as latices and artificial dispersions of "rubber" materials as described above, treated or compounded as desired.

It is understood that the invention is not limited to the specific embodiment shown in the example as it will be evident to those skilled in the art that the invention permits of various modifications without departing from the spirit thereof, and it is my intention not to be limited in the scope of the invention except as required by the state of the art and as set forth in the appended claims.

Having thus described my invention, what I claim and desire to protect by Letters Patent is:

1. In a method of reducing the cross-sectional dimensions of rubber thread, the steps comprising stretching an unvulcanized rubber thread, relieving stresses produced thereby while the thread is so stretched and thereafter vulcanizing said thread.

2. In a method of reducing the cross-sectional dimensions of rubber thread, the steps comprising continuously stretching an advancing rubber thread, and relieving stresses produced thereby while the thread is so stretched.

3. In a method of reducing the cross-sectional dimensions of rubber thread, the steps comprising stretching a rubber thread to a size smaller than the desired size, annealing the thread while so stretched to partially relieve the stresses produced thereby, and then allowing it to retract to the desired size.

4. In a method of reducing the cross-sectional dimensions of rubber thread, the steps comprising continuously stretching an advancing rubber thread to a size smaller than the desired size, partially relieving stresses produced thereby by heating said thread at an elevated temperature while so stretched, and then allowing it to retract to the desired size.

5. The method of producing a rubber thread of a desired size comprising making a thread of a size larger than the desired size, stretching said thread to a size smaller than the desired size, annealing the thread while so stretched to partially relieve the stresses produced thereby, and then allowing the thread to retract to the desired size.

6. The method of producing a rubber thread of a desired size, comprising making an unvulcanized thread of a size larger than the desired size, continuously stretching said thread to a size smaller than the desired size, continuously relieving stresses produced thereby while the thread is so stretched, allowing the thread to retract to the desired size and then vulcanizing said thread.

7. The method of producing a rubber thread of a desired size, comprising making an unvulcanized thread of a size larger than the desired size, stretching said thread to a size smaller than the desired size, allowing the thread to retract to the desired size, and then vulcanizing said thread.

8. The method of producing a rubber thread of a desired size comprising forming directly from an aqueous dispersion of rubber a thread of a size larger than the ultimately desired size, thereafter stretching said thread to reduce the cross-sectional dimensions thereof, and subjecting the thread so stretched to the action of a fluid annealing medium.

9. The method of producing a thread of a desired size comprising forming directly from an aqueous dispersion of rubber a continuous length of unvulcanized thread of a size larger than the desired size, thereafter continuously stretching said thread to reduce the cross-sectional dimensions thereof, continuously relieving stresses produced thereby while the thread is so stretched, and then vulcanizing said thread.

10. The method of producing a rubber thread comprising streaming an aqueous dispersion of rubber through a nozzle of a given size and forming a rubber thread therefrom, stretching said thread to decrease its cross-sectional dimensions, and relieving stresses produced thereby while the thread is so stretched.

11. The method of producing a rubber thread comprising streaming an aqueous dispersion of rubber through a nozzle of a given size and forming an unvulcanized rubber thread therefrom, stretching said thread to decrease its cross-sectional dimensions, annealing the thread while so stretched to at least partially relieve stresses produced thereby, and then vulcanizing said thread.

12. The method of producing a rubber thread comprising streaming an aqueous dispersion of rubber through a nozzle of a given size and forming an unvulcanized rubber thread therefrom, continuously stretching said thread to decrease its cross sectional dimensions and while the thread is so stretched relieving stresses produced thereby, and then vulcanizing said thread.

13. The method of producing a rubber thread comprising streaming an aqueous dispersion of rubber through a nozzle of a given size and forming an unvulcanized rubber thread therefrom, stretching said thread to decrease its cross sectional dimensions, annealing the thread while so stretched to partially relieve the stresses produced thereby, allowing the thread to retract to a predetermined size smaller than the original size, and then vulcanizing said thread.

14. The method of producing rubber thread of a predetermined size which comprises forming directly from an aqueous dispersion of rubber a thread of a size larger than the ultimately desired size, continuously feeding the thread tensionally over a succession of rolls rotating at progressively greater peripheral speeds, and while under tension partially removing stresses produced thereby, and delivering the thread substantially without tension to a take-up means moving at a surface speed less than that of the last of said rolls.

15. The method of producing rubber thread of a predetermined size which comprises forming directly from an aqueous dispersion of rubber a thread of a size larger than the ultimately desired size, feeding the thread tensionally over a succession of rolls rotating at progressively greater peripheral speeds, exposing the thread to an annealing medium during at least a part of the course of its travel over said rolls, and delivering the thread substantially without tension to a take-up means moving at a surface speed less than that of the last of said rolls.

16. The method of producing rubber thread of a predetermined size which comprises forming directly from an aqueous dispersion of rubber a thread of a size larger than the ultimately desired size, feeding the thread tensionally over a succession of rolls rotating at progressively greater peripheral speeds, subjecting the thread while under tension to the action of a heated fluid annealing medium, and delivering the thread substantially without tension to a take-up means moving at a surface speed less than that of the last of said rolls.

17. In an apparatus for producing rubber thread, means for stretching formed thread comprising a succession of rolls rotatable at progressively greater peripheral speeds, and a receptacle for containing a fluid annealing medium through which the stretched thread passes during at least part of the course of its travel over said rolls.

18. Apparatus for producing rubber thread directly from an aqueous dispersion of rubber, comprising means for forming from such dispersion a coagulated thread of a size larger than the ultimately desired size, means for stretching the formed thread comprising a succession of rolls rotatable at progressively greater peripheral speeds, means for delivering the thread from said thread-forming means to said stretching means, a receptacle for an annealing fluid through which the thread passes during at least part of the course of its travel over said stretching means, a drier, and means for delivering the annealed thread from said stretching means to said drier.

ERNEST J. JOSS.